United States Patent [19]
Scherenberg

[11] 3,730,300
[45] May 1, 1973

[54] MOTOR VEHICLE
[75] Inventor: Hans O. Scherenberg, Stuttgart 71, Germany
[73] Assignee: Daimler-Benz Aktiengesellschaft, Stuttgart-Untertuerkheim, Germany
[22] Filed: Apr. 27, 1971
[21] Appl. No.: 137,796

[30] Foreign Application Priority Data
Ap. 28, 1970 Germany..................P 20 20 679.5

[52] U.S. Cl.......................................188/5, 180/115
[51] Int. Cl. .................................................B60t 1/14
[58] Field of Search ..................188/5; 180/115, 125

[56] References Cited
UNITED STATES PATENTS

3,062,327  11/1962  Debus.....................................188/5
3,167,154  1/1965  Salvett....................................188/5

FOREIGN PATENTS OR APPLICATIONS

387,820  2/1933  Great Britain...........................188/5

*Primary Examiner*—Duane A. Reger
*Attorney*—Craig, Antonelli & Hill

[57] ABSTRACT

A motor vehicle, especially a passenger motor vehicle in which an inflatable cushion is arranged at the bottom side of the vehicle as emergency brake which in the inflated condition is pressed with a brake surface against the road surface.

23 Claims, 9 Drawing Figures

Patented May 1, 1973
3,730,300
2 Sheets-Sheet 1
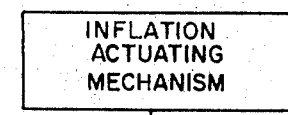
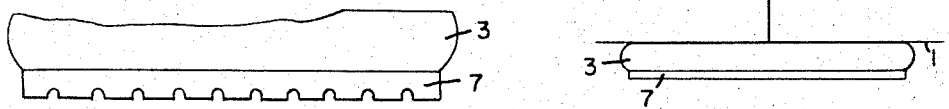
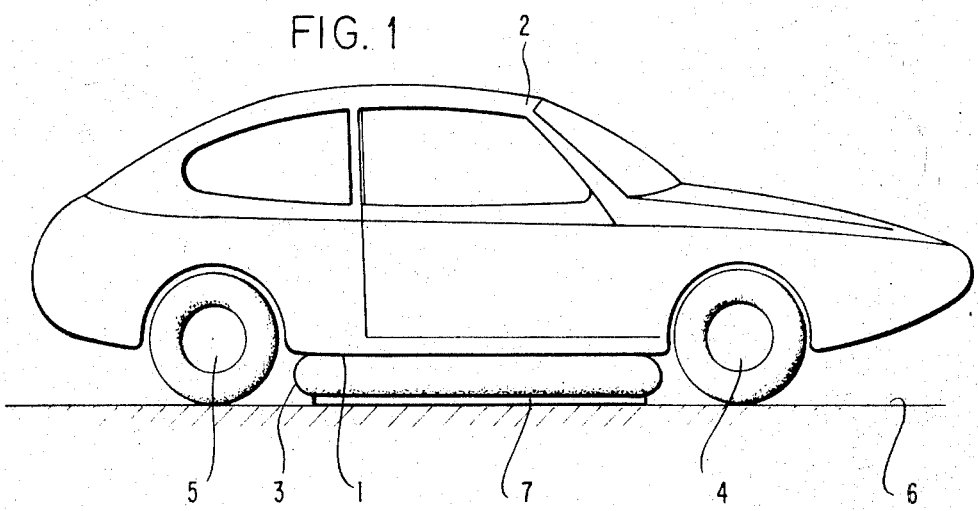
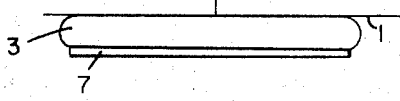
INVENTOR
HANS O. SCHERENBERG
BY Craig, Antonelli, Stewart & Hill
ATTORNEYS Patented May 1, 1973

MOTOR VEHICLE

The present invention relates to a motor vehicle, especially to a passenger motor vehicle, and is concerned with the task to equip the motor vehicle with an installation which permits in case of a danger a rapid and safe stopping of the vehicle also from high vehicle velocities.

The underlying problems are solved according to the present invention in that at least one inflatable gas cushion acting as emergency braking installation is arranged at the bottom side of the vehicle which in the inflated condition is pressed against the road surface.

A brake installation is provided by the arrangement of a gas cushion adapted to be pressed against the road surface which can be brought very rapidly to respond and which by reason of the extraordinarily large brake surface that may be provided, results in short brake paths not attained heretofore.

In an advantageous construction of the concept of the present invention the gas cushion may be provided with a preferably profiled and abrasion-resistant brake plate facing the road surface so that the gas cushion itself is not damaged during a braking operation and is utilizable repeatedly.

The gas cushion may be constructed inflatable independently of the actuation of the operating brake of the vehicle so that the inflation is adapted to be initiated at the will, for example, by the driver of the vehicle in case of a danger. However, it is also possible to construct the gas cushion so as to be inflatable in dependence on the actuation of the operating brake of the vehicle which may possibly be provided with an antilocking installation.

According to a further feature of the present invention, the arrangement may be made in such a manner that in the inflated condition the vehicle spring system can be unstressed only to such an extent within the area of the steerable axle of the vehicle by the limitation of the pressure in the gas cushion and/or the height of the gas cushion in the inflated condition that the vehicle remains steerable.

Furthermore, the construction may be made in such a manner that the vehicle springs of the unsteered axle are unloaded or unstressed more strongly by the gas cushion than the springs of the sterrable axle.

A simultaneous inflation of gas cushions arranged at the front end, at the side walls, at the rear end and possibly also on the roof of the vehicle may be connected with the inflation of the gas cushion used as emergency brake so that a circumferential protection for the vehicle is achieved by the other gas cushions in addition to the braking effect of the gas cushion underneath the vehicle.

In order to achieve in the interest of a straight guidance, a stabilizing effect of the gas cushion, the brake plate at the gas cushion may be provided with guide grooves or possibly also with guide rollers.

Finally, it is also possible to provide spikes at the brake plate in order to achieve favorable brake characteristics also in case of ice.

Accordingly, it is an object of the present invention to provide a motor vehicle equipped with an extraordinarily effective emergency brake which avoids the aforementioned shortcomings and drawbacks encountered heretofore.

Another object of the present invention resides in a motor vehicle which greatly increases the safety to the passengers by reason of the possibility of a rapid and safe stoppage of the vehicle even from high speeds.

Still, another object of the present invention resides in a motor vehicle with a brake installation that responds relatively rapidly and assures large brake surfaces.

Another object of the present invention resides in a motor vehicle of the type described above which is equipped with an emergency brake that is reusable during repeated braking operations.

These and other objects, features and advantages of the present invention will become more obvious from the following description when taken in connection with the accompanying drawing which shows, for purposes of illustration only, several embodiments in accordance with the present invention, and wherein:

FIG. 1 is a schematic side view of a motor vehicle equipped with an emergency brake in accordance with the present invention;

FIG. 2 is a partial front schematic view of the gas cushion and brake plate of FIG. 1;

Figure 5:
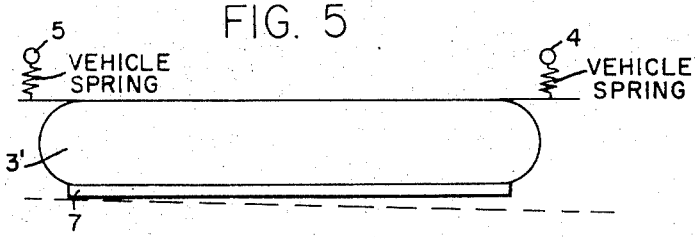
Figure 6:
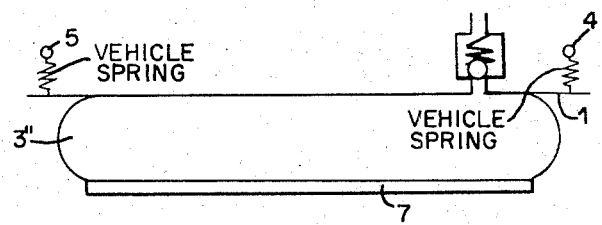
Figure 7:
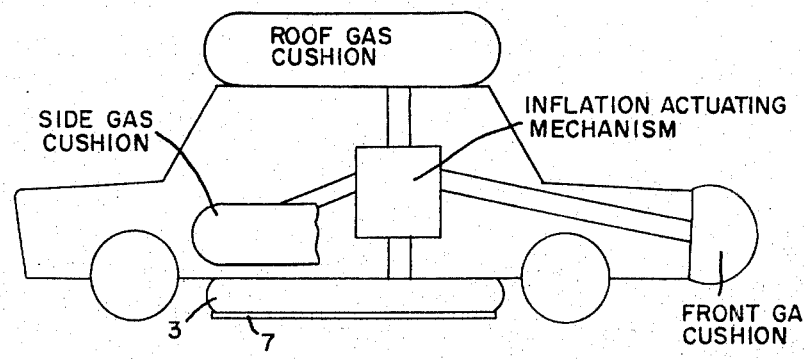
Figure 8:
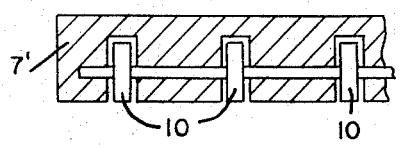
Figure 9:
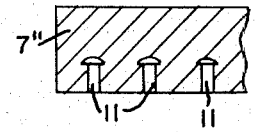

FIG. 3 schematically illustrates an arrangement for inflating the gas cushion;

FIG. 4 schematically illustrates another arrangement for inflating the gas cushion in response to actuation of the operating brake of the vehicle;

FIG. 5 schematically illustrates an expanded gas cushion for use with the present invention in which the height of the gas cushion is reduced at one end to facilitate steering of the vehicle steering wheels adjacent the one end;

FIG. 6 schematically illustrates an expanded gas cushion for use with the present invention which includes means for limiting the pressure therein to facilitate steering of the vehicle steering wheels;

FIG. 7 schematically illustrates an embodiment of the present invention including gas cushions at the front end, sidewalls, and roof of the vehicle in addition to the gas cushion braking arrangement of FIG. 1;

FIG. 8 is a partial cross-sectional schematic view showing a first embodiment of a brake plate with guide rollers; and FIG. 9 is a view similar to FIG. 8 and showing a second embodiment of a brake plate with spikes.

Referring now to the drawings, reference numeral 2 designates therein a motor vehicle of conventional construction which is equipped with a gas cushion 3 arranged at the bottom side 1 of the vehicle 2. The gas cushion 3 extends in the vehicle longitudinal direction substantially from the front axle 4 to the rear axle 5. This gas cushion 3 serves as emergency brake. In the non-inflated condition, it abuts tightly against the bottom side 1 of the motor vehicle. In case of a danger, the gas cushion 3 is inflated by a stored highly compressed gas taken along in the vehicle for that purpose to achieve a very strong braking effect so that it fills the space between the bottom side 1 of the motor vehicle 2 and road surface 6 and presses the brake plate 7 rigidly secured at the gas cushion 3, which is profiled in any conventional manner schematically illustrated in FIG. 2, against the road surface 6.

The construction of the emergency brake may be made in such a manner by the use of special means, for example, by the subdivision of the gas cushion into several cushion sections or by the arrangement of several gas cushions that the vehicle springs at the steered front axle 4 are unstressed by the gas cushion 3 only to such an extent that the vehicle remains steerable. In contrast thereto, the vehicle springs can be unstressed at the rear axle 5 to such an extent that the wheels at the rear axle are lifted off from the road surface. FIG. 5 schematically illustrates a gas cushion 3' which, in the expanded condition, exhibits a lesser height at one end to accommodate steering of the vehicle. FIG. 6 schematically illustrates a gas cushion 3'' with pressure release means at one end to accommodate steering of the vehicle.

Possibly in lieu of a conventional release mechanism of the inflation, operable at the will of a driver, also an automatic release mechanism of any known construction may be provided as are used for gas cushions that are provided within the vehicle as protection for the passengers. FIG. 3 schematically illustrates an inflation actuating mechanism for inflating the cushion 3. Since such automatic release mechanisms are known as such in the prior art and form no part of the present invention, a detailed description thereof is dispensed with herein.

The brake plate 7 of any suitable, known material, may be so constructed that with a non-inflated gas cushion 3 which is arranged in a storage compartment or container (not shown), the brake plate 7 forms the container closure wall in the downward direction. In order to achieve favorable straight guide properties, corresponding guide grooves such as schematically shown in FIG. 2 and/or possibly also guide rollers, such as schematically shown at 10 in plate 7' of FIG. 8, of any conventional construction may be provided at the brake plate 7. For winter operation, the arrangement of spikes, such as schematically shown at 11 in plate 7'' of FIG. 9 at the brake plate 7 is recommended. Again, such spikes may be provided on the brake plate 7 in any conventional manner.

The inflation of the gas cushion is either connected with an actuating mechanism of the operating brake which is possibly provided with a conventional anti-locking installation so that with the engagement of the vehicle operating brake also the gas cushion becomes effective. FIG. 4 schematically depicts this last-mentioned arrangement. In the alternative, the inflation of the gas cushion may also be independent of the vehicle operating brake as schematically illustrated in FIG. 3. In the latter case the arrangement of a release mechanism actuatable at will or the arrangement of automatically releasing feeler devices or sensors of any conventional construction are recommended. Of course, appropriate means may be provided in the former case to prevent inflation of the gas cushion during normal operation of the vehicle brakes.

FIG. 7 schematically illustrates an embodiment of the present invention similar to the FIG. 1 embodiment which also includes gas cushions at the front end, sidewalls, and roof of the vehicle.

While I have shown and described only several embodiments in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. An emergency braking system for braking a motor vehicle as it travels over a road surface; said braking system comprising: at least one inflatable gas cushion means arranged at the bottom side of the vehicle, an abrasion-resistant brake plate means attached to the bottom side of the inflatable gas cushion means in facing relationship to the road surface, and brake actuating means including cushion inflating means for inflating the gas cushion means to cause said brake plate means to brakingly engage the road surface.

2. A braking system according to claim 1, wherein said vehicle has operating brake means separate from said gas cushion means and brake plate means, and wherein said cushion inflating means includes means for inflating the gas cushion means independently of the actuation of said operating brakes.

3. A braking system according to claim 1, wherein said vehicle has operating brake means separate from said gas cushion means and brake plate means, and wherein said cushion inflating means includes means for inflating the gas cushion means in dependence on the actuation of said operating brakes.

4. A braking system according to claim 1, wherein said gas cushion means and brake plate means extend in the vehicle longitudinal direction substantially from a front axle of the vehicle to a rear axle of the vehicle.

5. A braking system according to claim 1, wherein said gas cushion means abuts tightly against the bottom side of the vehicle in the non-inflated condition.

6. A braking system according to claim 1, wherein said brake plate means forms a container closure wall in the downward direction for storing the gas cushion means in the non-inflated condition.

7. A braking system according to claim 6, wherein said gas cushion means abuts tightly against the bottom side of the vehicle in the non-inflated condition.

8. A braking system according to claim 1, characterized in that the brake plate means is profiled.

9. A braking system according to claim 3, characterized in that the operating brake means includes an anti-locking means.

10. A braking system according to claim 1, characterized by means for unstressing the vehicle springs in the inflated condition of the cushion means within a area of the steerable axle of the vehicle only to such an extent that the vehicle remains steerable.

11. A braking system according to claim 10, characterized in that said last-mentioned means includes means for limiting the pressure in the gas cushion means.

12. A braking system according to claim 11, characterized in that said means for unstressing the vehicle springs includes means for limiting the height of the gas cushion means in the inflated condition.

13. A braking system according to claim 10, characterized in that said means for unstressing the vehicle springs includes means for limiting the height of the gas cushion means in the inflated condition.

14. A braking system according to claim 10, characterized in that the vehicle springs of a non-steerable axle of the vehicle are more strongly unstressed by the gas cushion means in the inflated condition than the springs of the steerable axle.

15. A braking system according to claim 1, characterized in that gas cushion means are provided at the front end and at the side walls of the vehicle which are operatively connected with the first-mentioned gas cushion means so as to be inflated in unison with the inflation of the first-mentioned gas cushion means.

16. A braking system according to claim 15, characterized in that the vehicle further includes a gas cushion means on the roof which is also operatively connected with the first-mentioned gas cushion means for inflation in unison therewith.

17. A braking system according to claim 1, characterized in that the brake plate means is provided with means for assuring a rectilinear guidance of the vehicle.

18. A braking system according to claim 17, characterized in that said last-mentioned means includes guide grooves in the brake plate means.

19. A braking system according to claim 17, characterized in that said last-mentioned means includes guide roller means.

20. A braking system according to claim 1, characterized in that the brake plate means is provided with spikes.

21. A braking system according to claim 1, characterized in that means are provided to assure that the vehicle springs of a non-steerable axle of the vehicle are more strongly unstressed by the gas cushion means in the inflated condition than the springs of a steerable axle of the vehicle.

22. A braking system according to claim 1, characterized in that gas cushion means are provided at the front end and at the side walls of the vehicle which are operatively connected with the first-mentioned gas cushion means so as to be inflated in unison with the inflation of the first-mentioned gas cushion means.

23. A braking system according to claim 22, characterized in that the vehicle further includes a gas cushion means on the roof which is also operatively connected with the first-mentioned gas cushion means for inflation in unison therewith.

* * * * *